United States Patent Office 3,526,519
Patented Sept. 1, 1970

3,526,519
CONTROL OF APPLE STORAGE SCALD USING CERTAIN DIPHENYLAMINE COMPOSITIONS
Morton Kleiman, 2827 W. Catalpa Ave., Chicago, Ill. 60625
No Drawing. Filed July 12, 1967, Ser. No. 652,711
Int. Cl. A23b 7/14
U.S. Cl. 99—154    11 Claims

ABSTRACT OF THE DISCLOSURE

Treatment of apple storage scald with compositions comprising diphenylamine, emulsifier, and certain mono- or di-hydric aliphatic or alicylic hydroxy-compounds such as alcohols, glycols, polyglycols, glycol ethers, and polyglycol ethers.

---

This invention relates to new compositions of matter which are uniquely valuable for the treatment of apples that are to be held in cold storage and to a method of applying such compositions. More specifically, the new compositions of my invention are of great utility for application to apples prior to or shortly after placement thereof in cold storage, in order to prevent the development of storage scald on the fruit.

Storage scald is a physiological disorder which affects fruit after it has been in cold storage for some variable length of time. The cause of this disfunction remains unknown although it has been studied extensively for over forty years. Moreover, the occurrence of this physiological spoilage is not predictable, so that great economic losses can be sustained in some seasons unless the apples can be successfully treated to prevent its development. The most effective means of treating apples for scald prevention is the application thereto of the chemical diphenylamine. Heretofore, the latter has been applied to apples destined for cold storage in a finely particulate state of subdivision in water suspension, such suspensions being prepared by dispersing the finely milled chemical in water in the substantial absence of any auxiliary solvent. In one embodiment of this method, diphenylamine is finely milled with various diluents and adjuvants, and such mixture is added to the appropriate volume of water with agitation.

Although the use of such dispersions of diphenylamine in water for apple scald prevention is attended with excellent results, it is frequently desirable to be able to handle the active chemical in the form of a concentrated liquid solution rather than as a powdered product or an aqueous dispersion. Personnel who handle materials in fruit storage plants may be subject to sensitivity to the dust which gets into the air when measuring or weighing a powder, and managers of such operations are concerned that too much active material is frequently lost in the handling of a dry, powered product because of the dusting tendencies. Thus, there has been a need for a liquid form of diphenylamine-containing product suitable for dilution with water to make dispersions and emulsions which can be used for fruit treatment for storage scald prevention.

Prior to the present invention, efforts to make dispersions of diphenylamine in water with the aid of a solvent have employed an ethyl alcohol or isopropyl alcohol solution of the chemical. The use of such solutions has not been satisfactory, however, for a number of reasons, among which is fruit injury which results from the effects of the solvents per se, as well as from the tendency of these solvents to cause formation of undesirably large, crystalline aggregates of diphenylamine when the solutions are added to water. Relatively large, crystalline aggregates of diphenylamine produce fruit injury, and thus render the use of these solvents unsuitable. Furthermore, relatively large volumes of ethyl alcohol or of ispropyl alcohol are required, and this factor alone makes their use unpleasant and rather hazardous, owing to their high volatility.

It is an object of the present invention to provide new, liquid compositions which produce diphenylamine-containing emulsions and dispersions in water when mixed therewith, which are eminently effective for scald-preventive treatment of apples. Such compositions, upon admixture with water, promote thorough wetting of the apple surface, and spread the internal, emulsified phase thereon to form a substantially invisible, diphenylamine-containing coating having scald-preventive properties. It is a further object of my invention to make available conveniently handled and economical solutions of diphenylamine in specially suited solvent systems, which solutions have the hereinbefore enumerated, desired capabilities for dispersion or emulsification in water and for fruit treatment for storage scald prevention. These and other objects and advantages of my invention will become apparent to those skilled in the art from the following description thereof.

While as a general rule the concentrate compositions of the present invention will most advantageously be in the form of relatively free-flowing liquids at room temperatures, said concentrate compositions may, in certain instances, be in the form of solid solutions which will disperse upon addition to and admixture with water.

One of the distinct and noteworthy advantages of the compositions of the prevent invention is the ability and the proclivity of the dilute, aqueous emulsions prepared therefrom to spread the internal, disperse phase over the surface of the fruit being treated and to deposit thereon an extremely thin, substantialy invisible, diphenylamine-containing film, which is both scald-protective for apples placed in cold storage, and which at the same time avoids disturbing or altering the normal appearance of the fruit surface. When applications of diphenylamine are made to apples from dilute, aqueous, substantially organic solvent-free dispersions prepared from finely milled diphenylamine compositions, there often remains upon the surface of the fruit a visible deposit, powder-like in appearance and whitish or grayish-white in color, which residue is not always desirable in the eyes of consumers. By treating apples with dilute, aqueous emulsions prepared from the compositions of the present invention rather than from finely milled diphenylamine compositions, the formation of such visible residues is avoided. In addition, the tendency toward spreading of the internal, diphenylamine-containing, dispersed phase enhances the even application of the protective film and the draining of the excess liquid from the surface of the fruit, increasing thereby the efficiency of the operation.

I have discovered that unusually and extremely useful emulsifiable and dispersible solutions of diphenylamine can be prepared by the use conjointly of surfactants or emulsifiers and of certain hydroxy-compounds, namely, mono- and dihydric aliphatic and alicyclic alcohols; the term alcohol is used here in a generic sense to encompass compounds in which there is at least one free hydroxyl group, and includes glycols, glycol ethers, polyglycols, and polyglycol ethers, said compounds containing not less than four carbon atoms, having a molecular weight of not less than 90, and having a normal atmospheric boiling point of not less than 135° C. Such hydroxy-compounds should be of relatively low human toxicity or substantially non-toxic, and they must also form a solution in admixture with the diphenylamine and surfactants or emulsifiers to be used in the formulation. The terms surfactant and emulsifier are used interchangeably hereinafter to designate any materials which modify and affect the surface and interfacial properties of substances, which classes of compounds are generally well known to those skilled in the art.

In choosing hydroxy-compounds for the practice of my invention, it is particularly desirable to use those having a relatively higher boiling range over those having the lower boiling ranges in order to minimize odor and the tendency toward rapid evaporation from the solution. Thus, in the series of aliphatic and alicyclic monohydric alcohols, I prefer to use those members of the series having a molecular weight and a boiling point appreciably above the minimum values stated above, such materials possessing lower volatility and less odor than the lower members of the series. It is also preferred to use materials which are commonly and economically available. When substituents are present, such as keto-, alkoxy- or acyloxy-groups, the volatility and the odor are frequently considerably diminished over those of their unsubstituted counterparts. Similar considerations apply to the choice of glycol ethers. Thus, a preferred class of hydroxy-compounds useful in the practice of my invention are those which contain not less than six carbon atoms, which have a molecular weight of at least 115, and which have a normal atmospheric boiling point of at least 160° C. Another preferred class of hydroxy-compounds useful in the practice of my invention are the alkyl-substituted aryl ethers of polyglycols.

Some examples of the hydroxy-compounds which may be used in preparing the compositions of my invention include but are not limited to the following: n-hexanol, mixed isomeric hexanols, n-heptanol, mixed heptanol isomers, n-octanol, iso-octanol, nonanol, decanol, dodecanol, tridecanol, cyclohexanol, methylcyclohexanols, 1,3-butylene glycol, 1,4-butanediol, 1,5-pentanediol, 1,6-hexanediol, 1,10-decanediol, 2,2,4-trimethyl-1,3-pentanediol, 2-ethyl-1,3-hexanediol, 2-methyl-2-ethyl-1,3-propanediol, triethylene glycol, tetraethylene glycol, polyethylene glycols—especially those having average molecular weights of from about 200 to about 2000, methoxypolyethylene glycols having average molecular weights of from about 300 to about 1000, polypropylene glycols—especially those having average molecular weights of from about 400 to about 2000, polyethylene glycol-polypropylene glycol co-polymers, tridecyloxy polyethylene glycols, nonylphenoxy polyethylene glycols, p-octylphenoxy polyethylene glycols, p-dodecylphenoxy polyethylene glycols, ethoxyethanol, n-butoxyethanol, methoxytriglycol, ethoxytriglycol, n-propoxypropanol, 2-ethylhexanol, and many others which would be too numerous to list fully, but which will at once become apparent to one skilled in the art.

The discovery that diphenylamine can be used in combination with hydroxy-compounds such as those described herein to prevent apples from developing storage scald is unexpected, as it has been noted in past investigations that alcohols are harmful to fruit "finish," i.e., to the smooth and ordinarily unblemished, normal condition of the fruit surface. In fact, the application of ethyl alcohol or isopropyl alcohols and other members of the series to the surface of an apple causes a browning and blistering of the skin surface which are characteristic of and virtually indistinguishable from the discoloration and injury which typify apple storage scald. By contrast, when apples are treated with the dilute dispersions and emulsions prepared from the compositions of my invention at the normal usage concentrations, not only is the absence of severe injury to the fruit a striking departure from what would be expected, but the fruit is actually protected from scald injury.

In the practice of my invention, diphenylamine is combined with one or more hydroxy-compounds of the classes defined above, and with any of a wide selection of one or more emulsifying agents, a combination of two or more of the latter generally being more desirable, it only being necessary that the materials chosen be compatible at ordinary temperatures and be present in sufficient amounts to form a solution which can be emulsified or dispersed in water. The number of hydroxy-compounds and of emulsifiers which are selected to be combined to prepare a formulation within the scope of my invention is not critical, it being possible to use several such materials to good advantage in a large variety of possible combinations. Also, the order or manner of mixing, and the temperature of mixing are not important or critical, nor is it significant if in some instances relatively minor amounts of some insoluble material may separate to produce a turbidity or to give a precipitate in small proportion; minor amounts of such precipitate or turbidity can be removed in any suitable manner, as by settling and decantation, or by filtration, and do not constitute incompatibility for the purposes of the practice of the invention.

In the preparation of the dilute, aqueous dispersions and emulsions from the concentrate compositions of the present invention, it is necessary only to provide a sufficient degree of mixing for a sufficient time to obtain the desired dispersion. Such mixing may be provided by turbulent flow in a section of pipe, or by adding the concentrate to water at high velocity through an orifice, or by high-shear stirring, or by passing a mixture of concentrate solution and water through a colloid mill, or by mixing with a simple paddle mixer in a tank, or by any other convenient means suitable to the size and nature of the equipment and the characteristics of the concentrate solution. As will be evident to those skilled in the art, it is possible to make compositions within the scope and spirit of my invention which are capable of emulsification and dispersion in water under conditions varying from very slight agitation of short duration to conditions of vigorous, high-shear, and continuous agitation.

The compositions of my invention are generally added to water with agitation and mixing so as to produce an emulsion which contains a preferred concentration, by weight, of from about 0.1 to about 0.2 percent of diphenylamine. While these concentrations are not critical, it has been found that most varieties of apples can be beneficially treated for scald prevention within this range, although lower concentrations such as 0.05 and in some instances even 0.025 percent can be satisfactorily employed, and higher concentrations, e.g., 0.3, 0.4, and 0.5 perecnt may be used. Generally speaking, the fruit is treated by simply dipping it (in boxes or other containers) into the dilute emulsion, allowing the fruit to remain in contact with the liquid for a short time, the length of immersion time not being a critical factor, then removing the fruit and placing it in storage. Alternatively, the liquid emulsion may be sprayed onto the fruit while the latter is still on the tree, or it may be sprayed onto the already harvested fruit as the latter is moved down a roller sorter or a conveyor. Various alternative modes of application of the dilute emulsions prepared in accordance with my invention will be evident to operators skilled in the handling of apples and in the operation of storage houses. It will suffice to note that the manner of application is not a critical factor, it only being necessary to make certain that all of the fruit is adequately wet with the liquid and that the fruit is drained sufficiently after treatment to avoid its standing in an accumulation of the treating liquid which has drained.

In practice, the emulsifiable concentrate solutions of my invention may contain, by weight, as little as about 5% diphenylamine, or as high as about 65 or 70% diphenylamine, although the preferred and especially useful concentrations will generally fall within the range of from about 15 to about 50% diphenylamine. Similarly, the useful range of hydroxy-compound concentration, by weight, will extend from as low a value as even 1% to as high a concentration to about 85 or 90%. It is preferred, however, to use concentrations which will take full advantage of the desirable properties contributed to such solutions by the hydroxy-compounds and at the same time to avoid using excessive amounts so as to hold costs to economical limits. Thus the preferred hydroxy-compound concentrations will usually fall within the range of from about 5 to about 75% of the composition.

The surfactants and emulsifiers which may be used in the practice of my invention can be any of quite a large number and variety of types, it being necessary only that the materials selected be mutually compatible and soluble when incorporated with an hydroxy-compound or mixture of hydroxy-compounds and the diphenylamine. It is noteworthy that the new compositions of my invention disclosed herein, which are in the physical form of of homogeneous solutions, frequently result from a combination of materials which otherwise are not miscible or compatible with each other. Some of the hydroxy-compounds comprehended within the scope of my invention are in themselves surfactants and emulsifiers. Among the surfactants and emulsifiers which can be combined with other components in the practice of my invention the following may be mentioned for purposes of illustration, but it should be understood that it is not intended to limit hereby the selection of such materials to the types or individual examples listed:

(1) Polyethoxylated alkylphenols, e.g., polyethoxylated octylphenyl, polyethoxylated nonylphenol, polyethoxylated dodecylphenol, and other such materials, available commercially under the trade names "Triton X–," "Tergitol NP–," "Tergitol 12P," "Igepal CA," "Igepal CO," "Sterox," "Ninox," "Hyonic PE," and others; the number of moles of ethylene oxide per mole of alkylphenol being variable within wide limits, but commonly being of the order of from about 3 moles of ethylene oxide per mole of alkylphenol to about 30;

(2) Sulfated, polyethoxylated alkylphenols and their salts, available commercially under the trade names "Triton," "Alipal," "Cellopal," "Neutronyl S," "Sulfotex," and others;

(3) Polyethoxylated amines and amides, available commercially under the trade names "Amidox C," "Amidox L," "Emulphor V," "Ethofat," "Priminox," and others; the number of moles of ethylene oxide per mole of amine or amide being variable within wide limits, but commonly being of the order of about 3 to about 30 moles of ethylene oxide per mole of amine or amide;

(4) Long chain ($C_{12}$ and higher) fatty acid salts, e.g., oleic, palmitic, stearic, lauric acids, tall oil fatty acid salts of alkali metal and amines;

(5) Sorbitan esters of fatty acids, available commercially under the trade names "Armotan," "Emsorb," "Span," and many others;

(6) Polyethoxylated sorbitan esters of fatty acids, available commercially under the trade names "Tween," "Armotan," "Emsorb," and many others; these last two particular classes of emulsifiers alone and in combination with each other constituting a common and frequently-used type of emulsifier, favored particularly for food product applications;

(7) Polyethoxylated fatty acids and polyethoxylated fatty esters, available under the trade names "Surfactol," "Nonisol," "Emerest," "Emulphor EL," "Lipal," and others;

(8) Polyethoxylated long-chain alcohols, commercially available under various trade names, such as "Alkanol," "Brij," "Emulphor-ON," "Emulphogene BC," "Lipal," "Tergitol 3," and others;

(9) Sulfated, polyethoxylated, long-chain alcohols and their salts, commercially available under the trade names "Avirol," "Duponol," "Empicol," "Maprofix," "Sipon," and others;

(10) Alkyl aryl sulfonates, such as octyl-, nonyl-, dodecyl-, and tridecylbenzene sulfonic acids and salts thereof, available commercially under the trade names "Ahcowet,'" "Conco AAS," "Eccoterge ASB," "Ecconol 606," "Emcol," "Nacconol," "Ninate," "Orvus," "Petro," "Santomerse," "Siponate," and many others;

(11) Mono- and di-glycerides of fatty acids, available commercially under the trade names "Drewmulse," "Emcol," "Surfactol," "Arlacel," "Kessco," "Myverol," "Starfol," and others;

(12) N-acylsarcosine derivatives and salts thereof, available commercially under the trade names "Rokosyl," "Sarkosyl," and others;

(13) Fatty acid alkylol amide condensates, commercially available under the trade names "Alrosol," "Emcol," "Empilan," "Hyonic," "Ninol," "Nopcogen," "Onyxol," "Permalene," and others;

(14) Organic phosphate ester derivatives, commercially available under the trade names "Alkapent," "Antara," "Crestol," "Phosphonol," "Tergitol," "Victamul," "Victawet," "QS Surfactants," and others; the number of moles of ethylene oxide per mole of compound in all of the above-listed polyethoxylated surfactants being variable within wide limits, but commonly being of the order of from about 3 to about 30 moles per mole.

The foregoing list of emulsifiers and surfactants is by no means complete or exhaustive, as there are indeed numerous such materials available to the art in addition to those named above, and the selection of a desired emulsifier or combination of emulsifiers allows considerable variations as to types, relative amounts of various components, and selected properties, such as foam characteristics, degree of water solubility, rate of dissolution in water or dispersion in water, wetting and spreading powers, effects on surface and interfacial tension, and others. It would not be practically feasible to name all of the materials which are available to the trade, many of which are duplicates under different trade names, as can be noted from the numerous examples cited above. Moreover, the numerous combinations possible within the scope of the present invention will be amply evident to one skilled in the art, it being possible to utilize these many various materials in conjunction with hydroxy-compounds of the nature hereinbefore specified and defined to prepare the novel and useful compositions of my invention.

Some examples of emulsifiable and dispersible solutions of diphenylamine which are typical embodiments of the invention, based upon the detailed, foregoing disclosure, and utilizing some of the typical materials disclosed are presented below for purposes of more fully illustrating the practice of the invention. All percentages given are by weight.

EXAMPLE 1

A concentrate was prepared from diphenylamine, 15 g.; n-hexanol, 10 g.; and 75 g. of a mixture of 8% "Triton X–35" and 92% "Triton X–102." The latter two materials are commercial surfactants representing p-octyl-phenoxyphenyl ethers of polyethlene glycols.

One liter of dilute, aqueous diphenylamine emulsion containing 0.15% diphenylamine was prepared by dispersing 10 g. of said concentrate in water with vigorous agitation. Twenty-five freshly harvested Rome Beauty apples were sprayed with this emulsion until thoroughly wet to the point of run-off, and placed immediately in storage at 0° to 2° C. and 90% relative humidity. For comparison, an equal number of freshly harvested apples of the same variety were sprayed with water only, and placed under the identical cold storage conditions. The apples were removed after 152 days, held at room temperature of 20° to 23° C. for seven days, and then were rated for the extent of scald development. The following results were observed:

|  | Percent scald | Percent scald control |
|---|---|---|
| Test apples | 8 | 89.5 |
| Control apples | 76 | 0 |

The percent scald control is calculated in the following manner. Allow $x$ to represent the percent scald on the treated apples, $y$ to represent the percent scald on the control group of apples; then the percent scald control is expressed by the following formula:

$$\text{Percent Scald Control} = \frac{100(y-x)}{y}$$

The foregoing example illustrates the use of a simple, aliphatic, monohydric alcohol with diphenylamine and with surfactants of Class 1 hereinbefore described.

EXAMPLE 2

A concentrate was prepared from diphenylamine, 20 g.; 4-methylcyclohexanol, 20 g.; and 60 g. of a mixture of approximately equal parts of "Igepal CO–730" and "Emulphor EL–719," the latter two materials being commercial surfactants, the first of which represents an alkyl aryl ether of a polyglycol.

One liter of dilute, aqueous diphenylamine emulsion containing 0.2% diphenylamine was prepared by dispersing 10 g. of said concentrate in water with good, high-shear mixing. Twenty-five freshly harvested Cortland apples were dipped in the stirred emulsion and held therein for approximately 30 seconds. The apples were then removed and placed in cold storage under the conditions described in Example 1. For comparison, an equal number of freshly harvested apples of the same variety were dipped for a like period of time in water only, and were placed under the identical storage conditions. The apples were removed after 152 days, held at room temperature of 20° to 23° C. for seven days, and then were rated for the extent of scald development. The following results were observed:

|  | Percent scald | Percent scald control |
|---|---|---|
| Test apples | 0 | 100 |
| Control apples | 56 | 0 |

The foregoing example illustrates the use of an alicyclic, monohydric hydroxy-compound in combination with diphenylamine and with surfactants of Classes 1 and 7 hereinbefore described, the former being also a monohydric hydroxy-compound of the types disclosed hereinbefore.

EXAMPLE 3

A concentrate was prepared from 15 g. of diphenylamine; 15 g. 1,3-butylene glycol; and 70 g. of a mixture of approximately equal parts of "Igepal CO–730" and "Emulphor EL–719," the latter two materials being commercial surfactants, the first of which represents an alkyl aryl ether of a polygylcol.

One liter of dilute, aqueous diphenylamine emulsion containing 0.15% diphenylamine was prepared by dispersing 10 g. of said concentrate in water with agitation. Twenty-five freshly harvested Cortland apples were flooded with this emulsion by pouring it over them in a vessel provided with drainage at the bottom. The apples were then placed in cold storage under the conditions described in Example 1. For comparison, an equal number of freshly harvested Cortland apples were flooded in like manner with fresh water only, and were placed under the identical storage conditions. The apples were removed after 152 days, held at room temperature of 20° to 23° C. for seven days, and then were rated for the extent of scald development. The following results were observed:

|  | Percent scald | Percent scald control |
|---|---|---|
| Test apples | 4 | 93.7 |
| Control apples | 64 | 0 |

The foregoing example illustrates the use of an aliphatic, dihydric hydroxy-compound in combination with diphenylamine, and with surfactants of Classes 1 and 7 hereinbefore described.

EXAMPLE 4

A concentrate was prepared from 35 g. diphenylamine; 30 g. "Carbowax 600," which is a commercial grade of a polyethylene glycol; and 35 g. of a mixture of 15% "Span 20," 84% "Tween 20," and 1% morpholinium oleate.

One liter of dilute, aqueous diphenylamine emulsion containing 0.2% diphenylamine was prepared by dispersing 5.7 g. of said concentrate in water with agitation. Twenty-five apples, freshly harvested, of the Cortland variety, were dipped in this emulsion for approximately 30 seconds, then placed at once in cold storage under the conditions described in Example 1. For comparison, an equal number of freshly harvested Cortland apples were dipped in like manner in fresh water only, and were placed under the identical storage conditions. The apples were removed after 152 days, held at room temperature of 20° to 23° C. for seven days, and then were rated for the extent of scald development. The following results were observed:

|  | Percent scald | Percent scald control |
|---|---|---|
| Test apples | 4 | 94.5 |
| Control apples | 72 | 0 |

The foregoing example illustrates the use of a dihydric hydroxy-compound, viz., a polyglycol, in combination with diphenylamine and with surfactants of Classes 4, 5, and 6 hereinbefore described.

EXAMPLE 5

A concentrate was prepared from 20 g. diphenylamine, 40 g. "Carbowax 550," which is a commercial grade of a methoxy-polyethylene glycol, and 40 g. of a mixture of 15% "Span 20," 84% "Tween 20," and 1% morpholinium oleate.

One liter of dilute, aqueous diphenylamine emulsion containing 0.1% diphenylamine was prepared by dispersing 5 g. of said concentrate in water with agitation provided by a colloid mill. Twenty-five freshly harvested Rome Beauty apples were dipped in this emulsion for approximately 30 seconds each, then placed at once in cold storage under the conditions described in Example 1. For comparison, an equal number of freshly harvested Rome Beauty apples were dipped in like manner in water only, and were placed under the identical storage conditions. The apples were removed after 152 days, held at room temperature of 20° to 23° C. for seven days, and then were rated for the extent of scald development. The following results were observed:

|  | Percent scald | Percent scald control |
|---|---|---|
| Test apples | 16 | 80 |
| Control apples | 80 | 0 |

The foregoing example illustrates the use of a monohydric hydroxy-compound, viz., an ether of a polyglycol, in combination with diphenylamine, and with surfactants of Classes 4, 5, and 6 hereinbefore described.

EXAMPLE 6

A concentrate was prepared from 40 g. diphenylamine, 5 g. 1,6-hexanediol, and 55 g. of a mixture of surfactants comprising 55% "Tergitol NP–35," 40 g. "Tween 20" and 5% "Span 20." "Tergitol NP–35" is an alkyl aryl ether of a polyglycol.

One liter of dilute, aqueous diphenylamine emulsion containing 0.2% diphenylamine was prepared by dispersing 5 g. of said concentrate in water with agitation. Twenty-five freshly harvested Rome Beauty apples were dipped into this emulsion for approximately 30 seconds, then placed at once in cold storage under the conditions described in Example 1. For comparison, an equal number of freshly harvested Rome Beauty apples were dipped in like manner in water only, and were placed under the identical storage conditions. The apples were removed after 152 days, held at room temperature of 20° to 23° C. for seven days, and then were rated for the extent of scald development. The following results were observed:

|  | Percent scald | Percent scald control |
|---|---|---|
| Test apples | 4 | 93.7 |
| Control apples | 64 | 0 |

The foregoing example illustrates the use of a dihydric hydroxy-compound and a monohydric hydroxy-compound in combination with diphenylamine and with surfactants of Classes 1, 5, and 6 hereinbefore described.

EXAMPLE 7

A concentrate was prepared from 30 g. diphenylamine; 50 g. of a dodecyloxypolyethylene glycol available commercially under the trade name "Brij 35," which is a surfactant; and 20 g. of a surfactant mixture consisting of equal parts of "Triton X-114" and of "Emulphor EL-719."

Ten liters of dilute, aqueous diphenylamine emulsion containing 0.15% of diphenylamine was prepared by dispersing 50 g. of said concentrate in water with agitation. Twenty-five freshly harvested Rome Beauty apples were dipped in this emulsion for approximately 45 seconds, then placed dripping wet in cold stroage under the conditions described in Example 1. For comparison, an equal number of freshly harvested Rome Beauty apples were dipped in like manner in water only, and were placed under the identical storage conditions. The apples were removed after 152 days, held at room temperature of 20° to 23° C. for seven days, and then were rated for the extent of scald development. The following results were observed:

|  | Percent scald | Percent scald control |
|---|---|---|
| Test apples | 12 | 85 |
| Control apples | 80 | 0 |

The foregoing exmaple illustrates the use of a monohydric hydroxy-compound, viz., an alkyl polyglycol ether, in combination with diphenylamine and with surfactants of Classes 1 and 7 hereinbefore described. The alkyl polyglycol ether is a surfactant of Class 8, and the surfactant of Class 1, "Triton X-114," is an alkyl aryl polyglycol ether.

EXAMPLE 8

A concentrate was prepared from 40 g. diphenylamine and 60 g. of a mixture of commercial surfactants consisting of 4.5 g. of "Triton X-45" and 55.5 g. of "Triton X-102," which surfactants are both alkyl aryl ethers of polyglycols.

Five liters of dilute, aqueous diphenylamine emulsion containing 0.2% diphenylamine was prepared by dispersing 25 g. of said concentrate in water, agitating continuously and strongly. Twenty-five freshly harvested Cortland apples were dipped in this dispersion for approximately 45 seconds, then placed wet in cold storage under the conditions described in Example 1. For comparison, twenty-five freshly harvested Cortland apples were treated in identical manner with water only, and were placed under the identical storage conditions. The apples were removed after 152 days, held at room temperatures of 20° to 23° C. for seven days, and then were rated for the extent of scald development. The following were observed:

|  | Percent scald | Percent scald control |
|---|---|---|
| Test apples | 8 | 90 |
| Control apples | 80 | 0 |

The foregoing example illustrates the use of monohydric hydroxy compounds which are alkyl aryl polyglycol ethers and which are also surfactants of Class 1 hereinbefore described, in combination with diphenylamine.

The detailed disclosure of my invention and the description of the practice thereof in the many specific examples of suitable monohydric and dihydric aliphatic hydroxy-compounds, including alcohols, glycols, glycol ethers, polyglycols and polyglycol ethers containing not less than four carbon atoms, having a molecular weight of not less than 90, and having a normal atmospheric boiling point of not less than 135° C., and of the many and varied surfactants useful in combination therewith, and in the many examples of a wide variety of diphenylamine concentrate solutions and compositions which may be made from the combinations of the nature hereinbefore described in great detail now enable one skilled in the art to prepare many modifications and variations conforming to the breadth and spirit of the invention. All such variations and modifications are intended to be included within the scope of the claims.

I claim:
1. A liquid concentrate suitable for dispersion in an aqueous medium, useful for controlling apple storage scald, comprising a substantially homogeneous solution of from about 5% to about 70% diphenylamine, emulsifier, and from about 1% to about 90% hydroxy-compound selected from the group consisting of mono- and dihydric aliphatic and alicyclic hydroxy-compounds containing not less than four carbon atoms, having a molecular weight of not less than 90, and having a normal atmospheric boiling point of not less than 135° C.

2. A concentrate according to claim 1, in which said hydroxy-compound is selected from the group consisting of mono-hydric alcohols, glycols, glycol ethers, polyglycols, and polyglycol ethers.

3. An aqueous dispersion of the concentrate according to claim 1, containing from about 0.02% to about 0.5% diphenylamine.

4. A concentrate according to claim 1, in which the hydroxy-compound contains not less than six carbon atoms, has a molecular weight of not less than 115, and has a normal atmospheric boiling point of not less than 160° C.

5. A liquid concentrate suitable for dispersion in an aqueous medium, useful for controlling apple storage scald, comprising a substantially homogeneous solution of from about 5% to about 70% diphenylamine and from about 1% to about 90% of an hydroxy-compound having emulsifier properties, said hydroxy-compound being selected from the group consisting of mono- and dihydric aliphatic and alicyclic hydroxy-compounds containing not less than four carbon atoms, having a molecular weight of not less than 90, and having a normal atmospheric boiling point of not less than 135° C.

6. Method of controlling apple storage scald which comprises forming an aqueous dispersion of the concentrate of claim 1, said aqueous dispersion containing from about 0.02% to about 0.5% diphenylamine and applying said aqueous dispersion to apples.

7. Method of controlling apple storage scald which comprises forming an aqueous dispersion of the concentrate of claim 5, said aqueous dispersion containing from about 0.02% to about 0.5% diphenylamine and applying said aqueous dispersion to apples.

8. Method of controlling apple storage scald which comprises forming an aqueous dispersion of the concentrate of claim 4, said aqueous dispersion containing from about 0.02% to about 0.5% diphenylamine and applying said aqueous dispersion to apples.

9. Method of controlling apple storage scald which comprises forming an aqueous dispersion of the concentrate of claim 2, said aqueous dispersion containing from about 0.02% to about 0.5% diphenylamine and applying said aqueous dispersion to apples.

10. An aqueous dispersion of the concentrate according to claim 2, containing from about 0.02% to about 0.5% diphenylamine.

11. An aqueous dispersion of the concentrate according to claim 5, containing from about 0.02% to about 0.5% diphenylamine.

References Cited

UNITED STATES PATENTS

| 3,034,904 | 5/1964 | Kleiman | 99—154 |
| 3,376,142 | 4/1968 | Goonewardene | 99—154 |

MAURICE W. GREENSTEIN, Primary Examiner

J. M. HUNTER, Assistant Examiner

U.S. Cl. X.R.

99—156; 424—330